United States Patent
Yanagibashi et al.

(10) Patent No.: US 6,681,610 B2
(45) Date of Patent: Jan. 27, 2004

(54) PROCESS FOR EXTRUDING TUBE HAVING DIFFERENT SECTIONS AND DIE FOR TUBE EXTRUSION MOLDING

(75) Inventors: Yoshitaka Yanagibashi, Saitama (JP); Konomu Hoshi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/059,315

(22) Filed: Jan. 31, 2002

(65) Prior Publication Data

US 2002/0108425 A1 Aug. 15, 2002

(30) Foreign Application Priority Data

Jan. 31, 2001 (JP) .................................. 2001-024920

(51) Int. Cl.⁷ .............................................. B21C 25/08
(52) U.S. Cl. .............................. 72/260; 72/264; 72/269; 72/468
(58) Field of Search .................... 72/260, 264, 269, 72/467, 468

(56) References Cited

U.S. PATENT DOCUMENTS

| | | | | |
|---|---|---|---|---|
| 5,321,967 A | * | 6/1994 | Wakabayashi | 72/260 |
| 5,989,466 A | * | 11/1999 | Kato et al. | 264/40.5 |

FOREIGN PATENT DOCUMENTS

| | | | | |
|---|---|---|---|---|
| JP | 6-198327 | * | 7/1994 | 72/260 |
| JP | 6-198328 | * | 7/1994 | 72/260 |
| JP | 6-198329 | * | 7/1994 | 72/260 |
| JP | 6-285539 | * | 10/1994 | 72/260 |
| JP | 10-286619 A | | 10/1998 | |
| SU | 1692703 | * | 11/1991 | 72/260 |

* cited by examiner

Primary Examiner—Ed Tolan
(74) Attorney, Agent, or Firm—Birch, Stewart, Kolasch & Birch, LLP

(57) ABSTRACT

The present invention relates to an easy and cost effective process for extruding a tube having different intermediate sections in its longitudinal direction, and a die for forming a tube through this extrusion molding process. Tubes so formed may be used for a vehicle for example, particularly for the body frame of a motorcycle. The die for this extrusion molding process includes a fixed die and a movable variable die. The tube is formed by material extruded from an outflow passage which is formed by the superposition in the direction of extrusion of a fixed die hole and a variable die hole. The outflow passage has an opening for a tube wall for forming the wall of the tube, and openings for two intermediate walls for forming connecting walls in the inside space of the tube. The tube formed by this process is composed of a part having the connecting wall and a part having no connecting wall. This is accomplished by opening or blocking the opening for the intermediate wall by moving cores according to the amount of the movement of the variable die. The resulting tube has a rigidity that varies along the longitudinal direction of the tube.

10 Claims, 14 Drawing Sheets

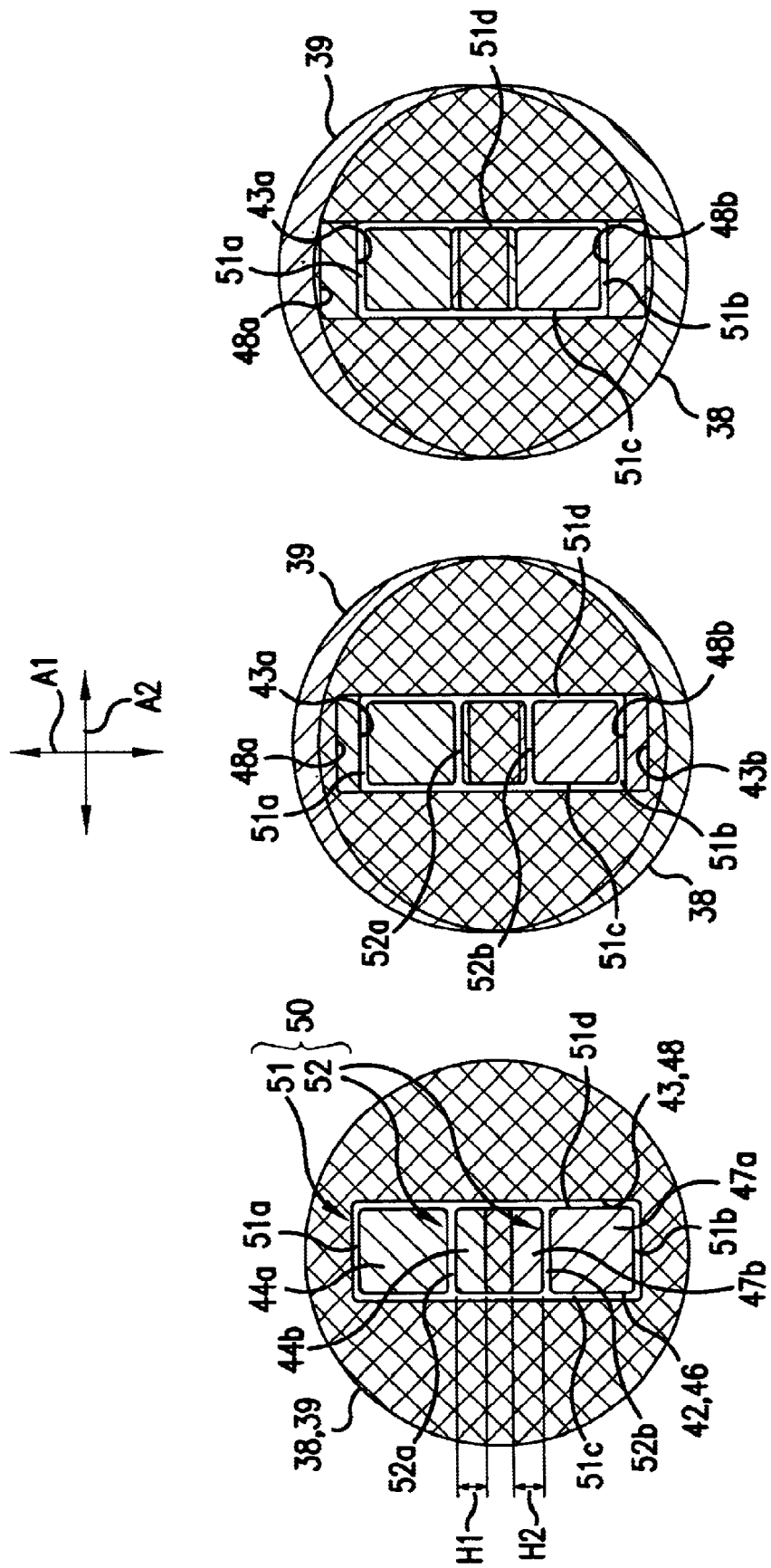

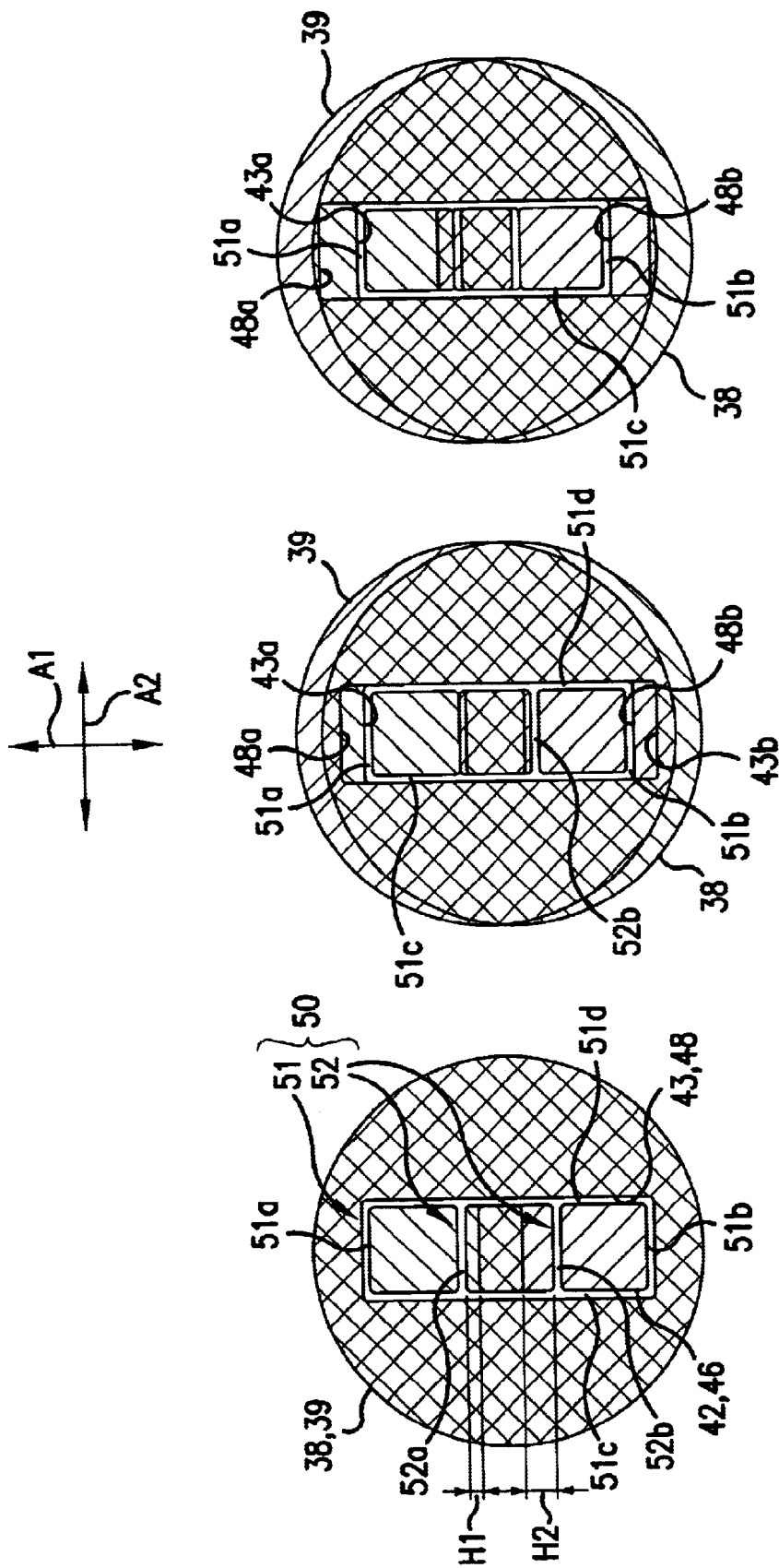

PROCESS FOR EXTRUDING TUBE HAVING DIFFERENT SECTIONS AND DIE FOR TUBE EXTRUSION MOLDING

CROSS-REFERENCE TO RELATED APPLICATIONS

The present application claims priority under 35 USC 119 to Japanese Patent Application No. 2001-024920 filed on Jan. 31, 2001, the entire contents thereof is hereby incorporated by reference.

BACKGROUND OF THE INVENTION

1. Field of the Invention

The present invention relates to a process for extruding a tube having different sections in its longitudinal direction, and a die for tube extrusion molding used when the tube is extruded. The tube is used for a vehicle for example, particularly for the body frame of a motorcycle.

2. Description of Background Art

A process for extruding a tube used for a member forming the body of a vehicle such as a motorcycle and having variable sections in its longitudinal direction and a die for extrusion used for extrusion molding, respectively, are disclosed in Japanese published unexamined patent application No. Hei 10-286619 (see FIG. 11). This die for extrusion is provided with a fixed female die having a fixed die hole and a slide die which has a slide die hole in the same shape as the fixed die hole and which can be slid on the lower surface of the fixed female die. Two or three fixed cores are arranged in parallel in the fixed die hole via clearance, and two or three slide cores integrated with the slide die are also arranged in parallel in the slide die hole via clearance. The slide core is laminated on the fixed core and can be slid on the fixed core. A tube-like member is formed (hereinafter merely called a tube) in the shape of a letter E or in the shape of the letter E having one more bar in the center of the inside of which a rib for reinforcement. The tube has a sectional form which changes in the longitudinal direction, and is formed by moving the slide die in a direction perpendicular to the direction of extrusion, extruding the material from a communicating part between the slide core and the fixed core, and between the fixed die hole and the slide die hole by the die for extrusion.

Since the width of the reinforcement rib of the above-mentioned conventional type changes, and extends in a longitudinal direction, the enhancement of the rigidity afforded by the rib may not be enough. One example of this is when a tube having a width that changes in the longitudinal direction is used for a part requiring high rigidity against a load that acts from a direction in which the width of the tube changes, such as when it is used as a main pipe of a motorcycle. In this case, the enhancement of the rigidity by the rib may not be sufficient.

In a situation in which a tube is connected to another member and a large load acts on a connection of the tube, in order to keep the tube as light in weight as possible, it is desirable to not to reinforce the whole tube, but only to reinforce the tube in the vicinity of the connection of the tube. However, in the conventional type tube described above, the rib for reinforcement is formed over the entire longitudinal direction of the tube. As such, the rib is formed in a part not requiring the enhancement of the rigidity, increasing the weight of a product using the tube, for example a vehicle. In addition, the amount of the material used for the tube becomes more than the required amount, and the cost of the material is increased. As a result, there is a problem in that the cost of the product using the tube is increased.

Ways to add rigidity selectively to only the part of the tube requiring rigidity have been considered. For example, a reinforcing member could be added by welding to only that part of the tube requiring the rigidity. However, this approach is problematic, in that an increase of manufacturing man hours and the increase of the cost by welding are caused.

Also, it is desirable that rigidity be enhanced only at the end of main pipe that connects to the head pipe. By maintaining a lesser rigidity at the other end of the pipe, ride quality is enhanced due to the spring action of the end of the pipe having less rigidity. However, there is no known conventional die or extrusion method capable of producing a pipe with these requirements.

SUMMARY AND OBJECTS OF THE INVENTION

The present invention is made in view of the above situation. The common object of the present invention is to provide an extrusion molding process wherein a tube having an intermediate wall extended in a direction crossing a direction in which the width of the tube changes can be easily and cost effectively formed. Further, the object of the invention is to provide an extrusion molding process wherein a tube the rigidity of only a required part of which is enhanced by an intermediate wall can be easily formed. An additional object of the invention is to provide a die for tube extrusion molding suitable for embodying the invention.

One aspect of the invention is a process for extruding a tube having different sections wherein a tube is formed by extruding the material via an opening formed by the superposition in the direction of extrusion of a first die hole formed in the first die, and a second die hole formed in the second die. The process uses a die for tube extrusion molding provided with the first die and the second die which are superposed in the direction of extrusion, and which can be relatively moved in a set direction along the superposed surface. The sectional form of the tube is varied in the direction of extrusion by relatively moving the first die and the second die in the set direction. Further, the process is characterized by extruding a tube having different sections through an outflow passage having an opening for a tube wall and an opening for at least one intermediate wall which continues to the opening for the tube wall inside the opening for the tube wall. The opening for the tube wall has a predetermined width extending in a first direction, which is a direction when the set direction is projected on a plane perpendicular to the direction of extrusion, and extends in a second direction crossing the first direction on the perpendicular plane and by relatively moving the first die and the second die in the set direction. Material is then extruded from the outflow passage, forming the wall of the tube, the width in the first direction varying in the longitudinal direction by means of the opening for the tube wall, and simultaneously forming the intermediate wall in the inside space of the tube by means of the opening for the intermediate wall, the intermediate wall having a fixed thickness of the predetermined width in the first direction, and extending in the longitudinal direction and continuing to the tube wall.

Additionally, according to the invention, one or more intermediate walls extended in the second direction crossing the first direction can be easily formed by the opening for the intermediate wall in the inside space of the tube in which the width of the wall formed by the opening for the tube wall varies in the first direction by relatively moving the first and second dies in the set direction. Material is then extruded from the outflow passage, causing the rigidity of the tube to be further enhanced by having one or more intermediate walls formed in the direction crossing the direction in which the width of the tube varies. Cost can also be reduced. In addition, since the intermediate wall can have a fixed thickness corresponding to the predetermined width in the longitudinal direction in situations when the width of the tube varies, the weight of the tube by forming the intermediate wall can be kept to a minimum.

The invention further includes the process for extruding the tube having different sections, whereby the intermediate wall is a connecting wall connecting two tube wall parts opposite in the second direction of the tube wall. This process partitions the inside space into a plurality of independent partial spaces on the section of the tube and a number of the connecting walls in the longitudinal direction of the tube. These spaces are changed by opening or blocking at least one of the openings for the intermediate walls according to the amount of the relative movement in the set direction of the first and second dies.

In addition, the present invention includes a process for producing a tube having high rigidity by forming the connecting wall connecting two tube wall parts opposite in the second direction crossing the first direction in which the width of the tube wall is changed. A tube can be formed with a part having one or more connecting walls and another part having no connecting wall, respectively, in the longitudinal direction. This is accomplished by controlling the amount of the relative movement of the first and second dies. As a result, the tube having a part with connecting walls of different numbers according to the magnitude of required rigidity, can be readily and cost effectively formed. In addition, as the connecting wall is formed in only a part of the tube requiring the high rigidity of the tube, the increase of the weight of the tube can be kept to a minimum, as compared with a tube having a connecting wall is formed over the entire longitudinal length of the tube.

Additionally, the present invention is based upon a die for tube extrusion molding provided with a first die and a second die which are superposed in a direction of extrusion and which can be relatively moved in a set direction along the superposed surface. The first die has a first die hole formed by a void between the first peripheral wall of a first hole formed in the first die and a first core arranged in the first hole and integrated with the first die. The second die has a second die hole formed by a void between the second peripheral wall of a second hole formed in the second die and a second core arranged in the second hole and integrated with the second die. Further an opening formed by the superposition in the direction of extrusion of the first die hole and the second die hole forms the outflow passage of the material of the formed tube. The first core is composed of a plurality of child cores arranged in parallel, having predetermined width in a first direction which is a direction when the set direction is projected on a plane perpendicular to the direction of extrusion and forming a void between at least one of the first cores extended in a second direction crossing the first direction on the perpendicular plane. The outflow passage has an opening for a tube wall formed by a void between the first peripheral wall or the second peripheral wall and the first core or the second core and an opening for a first intermediate wall defined by the void between the first cores and continuing to the opening for the tube wall. The first die and the second die are superposed so that the maximum interval in the first direction of the opening for the tube wall can be varied according to the amount of the relative movement in the set direction of the first die and the second die. The second core keeps at least one of the openings for the first intermediate wall in an open state by the predetermined width and in a blocked state.

The width in the first direction of the wall of the tube can be changed by the outflow passage having the opening for the tube wall formed by the first and second die holes of the first and second dies superposed so that they can be relatively moved in the set direction, and the openings for one or more first intermediate walls opened or blocked by the second core. Thus, the tube can be formed having high rigidity, the result of it having one or more intermediate walls extended in the second direction in the inside space of the tube via the opening for the first intermediate wall, and extended with fixed thickness corresponding to the predetermined width of a void between the first cores in the longitudinal direction. Further, the tube composed of the combination of a part having one or more intermediate walls in the longitudinal direction, and another part having no intermediate wall, can be easily formed by controlling the amount of the relative movement of the first and second dies.

The invention is further characterized in that the void between the first cores is continuously extended in a second direction, the second core is composed of a plurality of child cores arranged in parallel respectively having predetermined width in the first direction, thus forming a void between at least one second cores continuously extended in the second direction. The outflow passage has an opening for a second intermediate wall defined by a void between the second cores and continuing to the opening for the tube wall. The first die and the second die are superposed, so that the first core keeps at least one of the openings for the second intermediate wall in an open state by the predetermined width and in a blocked state, according to the amount of the relative movement in the set direction of the first die and the second die.

The outflow passage has the openings for one or more first intermediate walls opened or blocked by the second core, and continuously extends in the second direction and continuing to the opening for the tube wall. The openings for one or more second intermediate walls are opened or blocked by the first core, and continuously extend in the second direction and continuing to the opening for the tube wall. With the die of the present invention, it is possible to form a tube having high rigidity as a result of the connecting walls, which are two or more intermediate walls extended in the second direction in the inside space of the tube, and extended in the longitudinal direction with fixed thickness corresponding to the predetermined width of a void between the second cores, connecting the tube wall in the second direction. Further, with the present invention, a tube can be easily formed composed of the combination of a part having two or more connecting walls in the longitudinal direction, and another part having one connecting wall, and a third part having no connecting wall. This is accomplished by controlling the amount of the relative movement of the first and second dies according to the magnitude of the rigidity required at every part in the longitudinal direction of the tube.

In this specification, "superposition" means "being superposed". The "section of the tube" means the "cross section of a plane perpendicular to the direction of extrusion or the longitudinal direction of the tube".

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 10A, 10B, and 10C are plans for explaining the positional relation of the fixed die and the variable die when the fixed die and the variable die are superposed and the variable die is moved;

FIGS. 12A, 12B, and 12C show the second embodiment and correspond to FIGS. 10A, 10B, and 10C in the first embodiment;

DETAILED DESCRIPTION OF THE PREFERRED EMBODIMENTS

Referring to FIGS. 1 to 15, embodiments of the invention will be described below.

Figure 1:
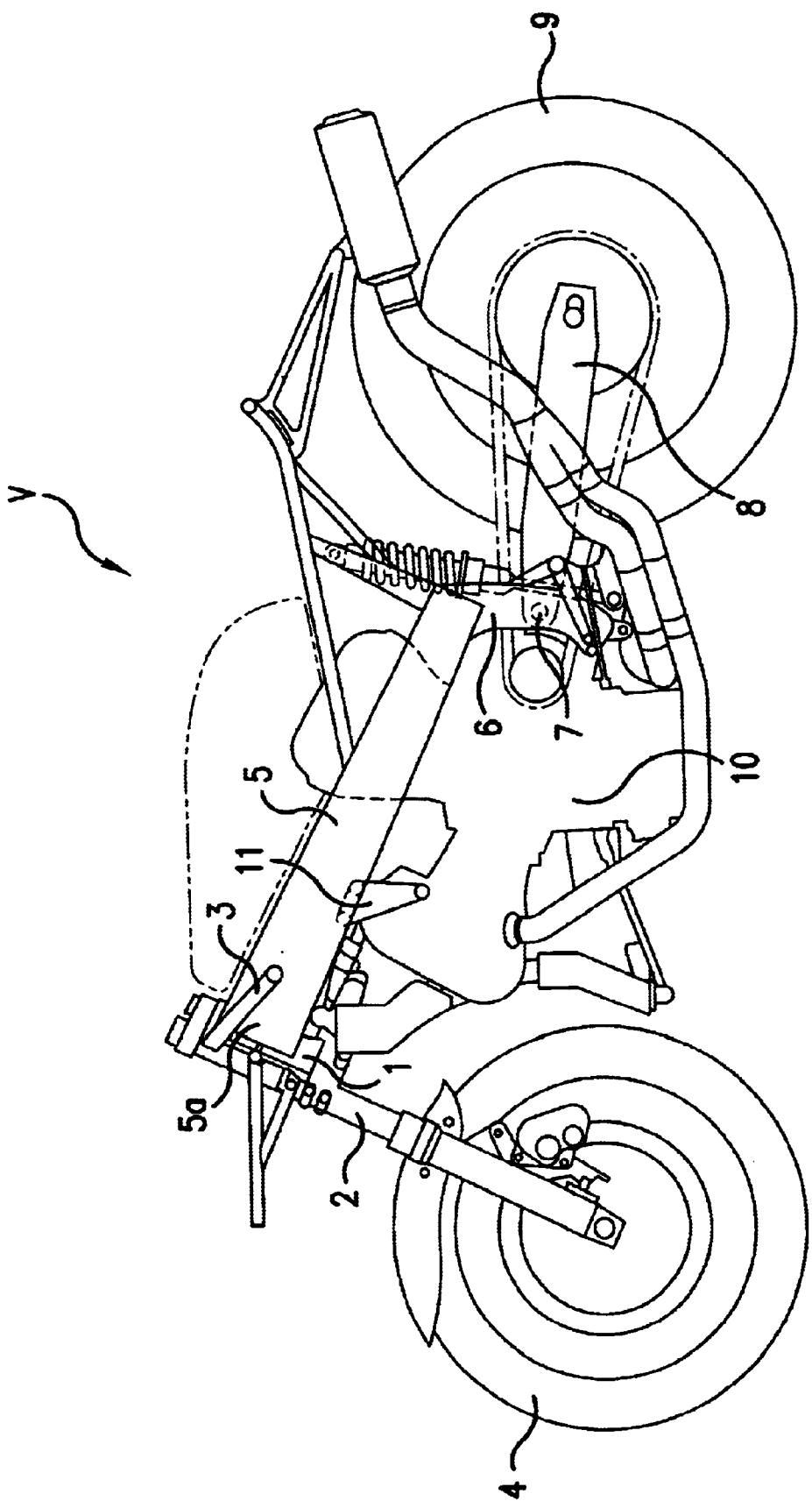
FIG. 1 shows a first embodiment of the invention and is a schematic left side view showing a motorcycle provided with a main pipe formed by a tube extruded using a die for tube extrusion molding according to the invention.

FIGS. 1 to 10 show a first embodiment of the invention. FIG. 1 is a schematic left side view showing a motorcycle V in which a tube formed in an extrusion molding process using a die for tube extrusion molding according to the invention is used for a main pipe. In the motorcycle V, handlebar 3 is provided at the upper end of front fork 2 supported by head pipe 1 so that the front fork can be turned. Front wheel 4 is supported at the lower end of the front fork by a shaft. A pair of right and left main pipes 5, the front end of each of which is connected to head pipe 1, are extended diagonally downward in the rear of a vehicle body, being spread symmetrically right and left. The vicinities of the back ends of the main pipes are coupled by a cross pipe (not shown). A pair of right and left pivot plates 6 are respectively connected to the back ends of both main pipes 5. Rear fork 8 supporting rear wheel 9 via a shaft is supported by pivot 7 supported by both pivot plates 6 so that the rear fork can fluctuate. The front of internal combustion engine 10 is supported via a pair of right and left engine hangers 11. The rear is supported by both main pipes 5 via both pivot plates 6.

In the first embodiment, "the upper and lower sides, the front and the rear and the right and the left" respectively mean the upper and lower sides, the front and the rear and the right and the left of a vehicle.

Figure 2:
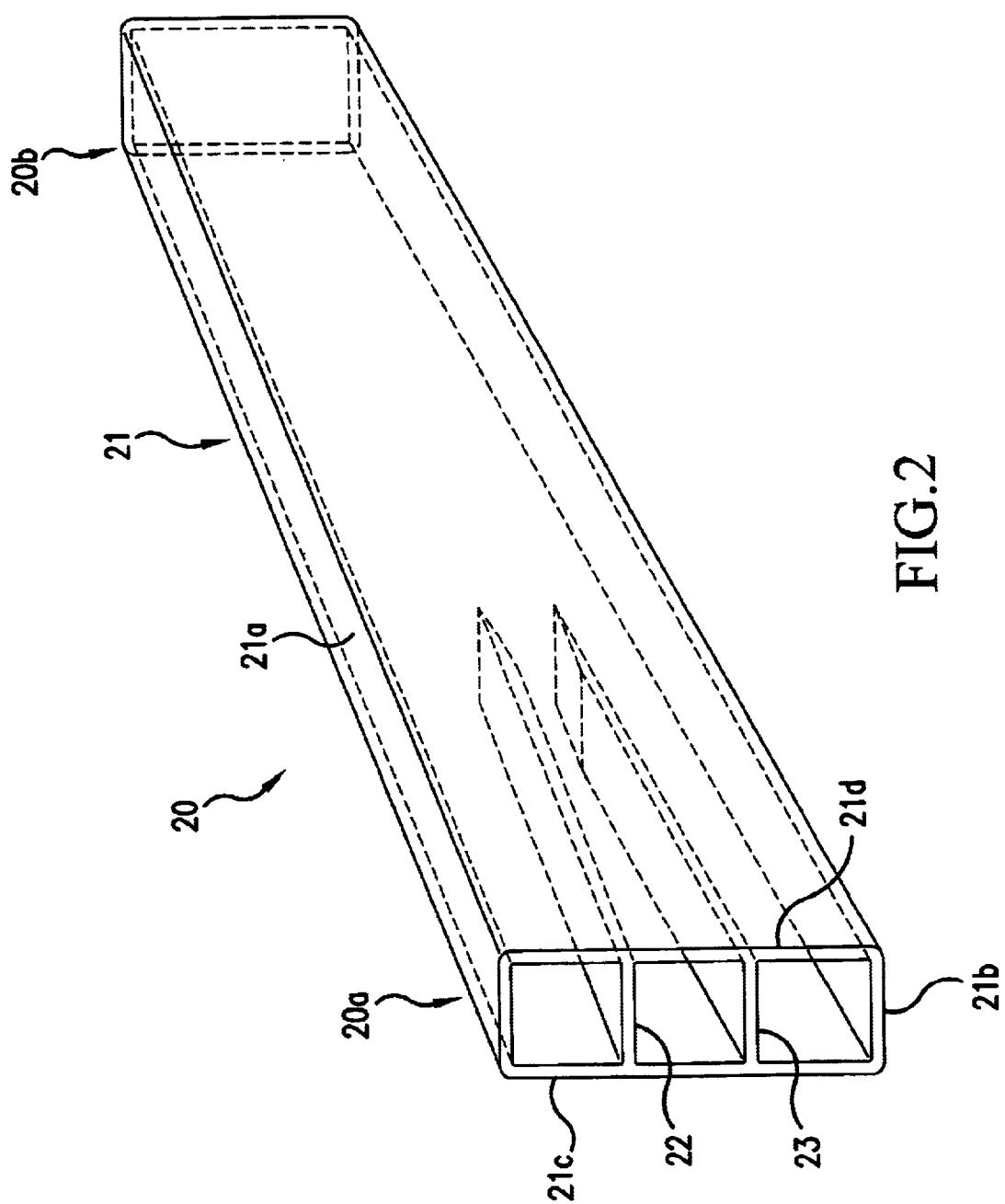
FIG. 2 is a perspective view showing the tube forming the main pipe shown in FIG. 1.

Each main pipe 5 is produced by working a tube 20 made of aluminum or an aluminum alloy, shown in FIG. 2, and formed by extrusion molding such as bending. Tube 20, the sectional form of which changes in a longitudinal direction (in the direction of extrusion in forming), has a tube wall 21 composed of first tube wall part 21a, second tube wall part 21b, third tube wall part 21c, and fourth tube wall part 21d. Tube wall 21 has a substantially rectangular closed section having a predetermined thickness. The rectangular section being longer on its vertical side. A vertical load acts on each main pipe 5 from front fork 2, pivot 7 and others. In addition, a bending moment based upon the load and the return moment acts on the front of each main pipe 5 having a connection 5a with head pipe 1, and therefore on the front of main pipe 5 including connection 5a. As such, the connection end of the main pipe requires high rigidity. Therefore, in the inside space of tube 20, two connecting walls 22 and 23 connecting the third tube wall part 21c and the fourth tube wall part 21d are vertically formed creating a reinforcing wall between first tube wall part 21a and second tube wall part 21b. Therefore, the sectional form of tube 20 is formed so that connecting walls 22 and 23 form the shape of a letter "E" having one more bar and in the section. The inside space at the front part of the tube is thus partitioned into three independent partial spaces. No connecting walls 22 and 23 are formed in the rear part of each main pipe 5 of tube 20. This rear space is a single inside space is formed by tube wall 21 of tube 20.

Figure 3:
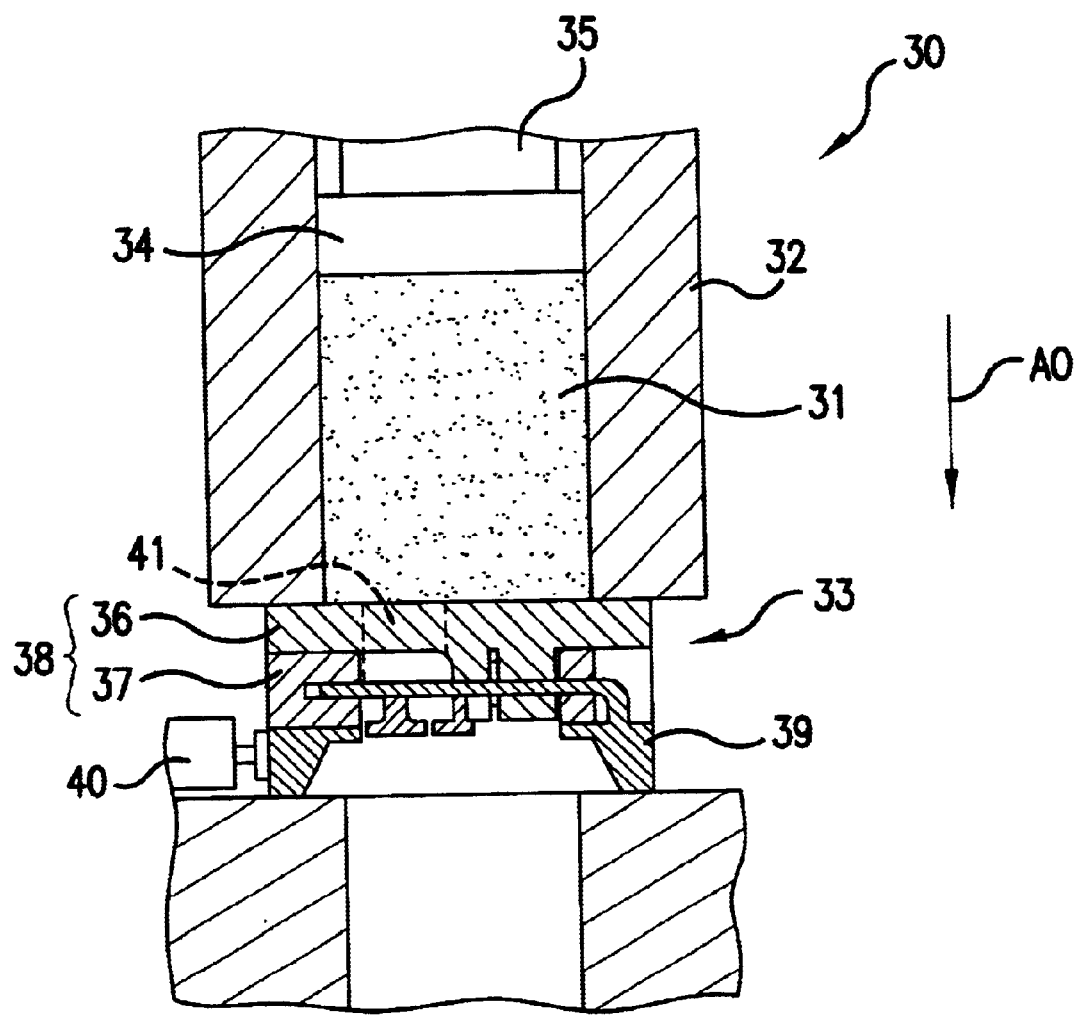
FIG. 3 is a sectional view showing the main part of an extruder for forming the tube shown in FIG. 2.

Next, referring to FIG. 3, extruder 30 for extruding tube 20 will be described. Extruder 30 is provided with container 32 for housing aluminum or an aluminum alloy which is the material 31 (the billet) of tube 20, die for tube extrusion molding 33, dummy block 34 for extruding material 31 from container 32, and stem 35 that transmits force caused by a ram to dummy block 34. The die for tube extrusion molding 33 is provided with fixed male die 36 fixed to container 32, fixed female die 37 superposed on fixed male die 36 and fixed to the fixed male die and variable die 39 which is superposed on fixed female die 37. Variable die 39 can be slid along the superposed surface, and dies 36, 37, and 39 are sequentially arranged in direction A0 in which material 31 is extruded. Fixed male die 36 and fixed female die 37 are mutually connected and integrated and compose fixed die 38. Variable die 39 is moved along the superposed surface for fixed die 38 by drive unit 40 in a direction that crosses the direction of extrusion A0, in a set direction which is a perpendicular direction in the first embodiment. Reference number 41 denotes a plurality of passages provided in fixed male die 36 for leading material 31 to an opening described later.

Figures 9A, 9B:
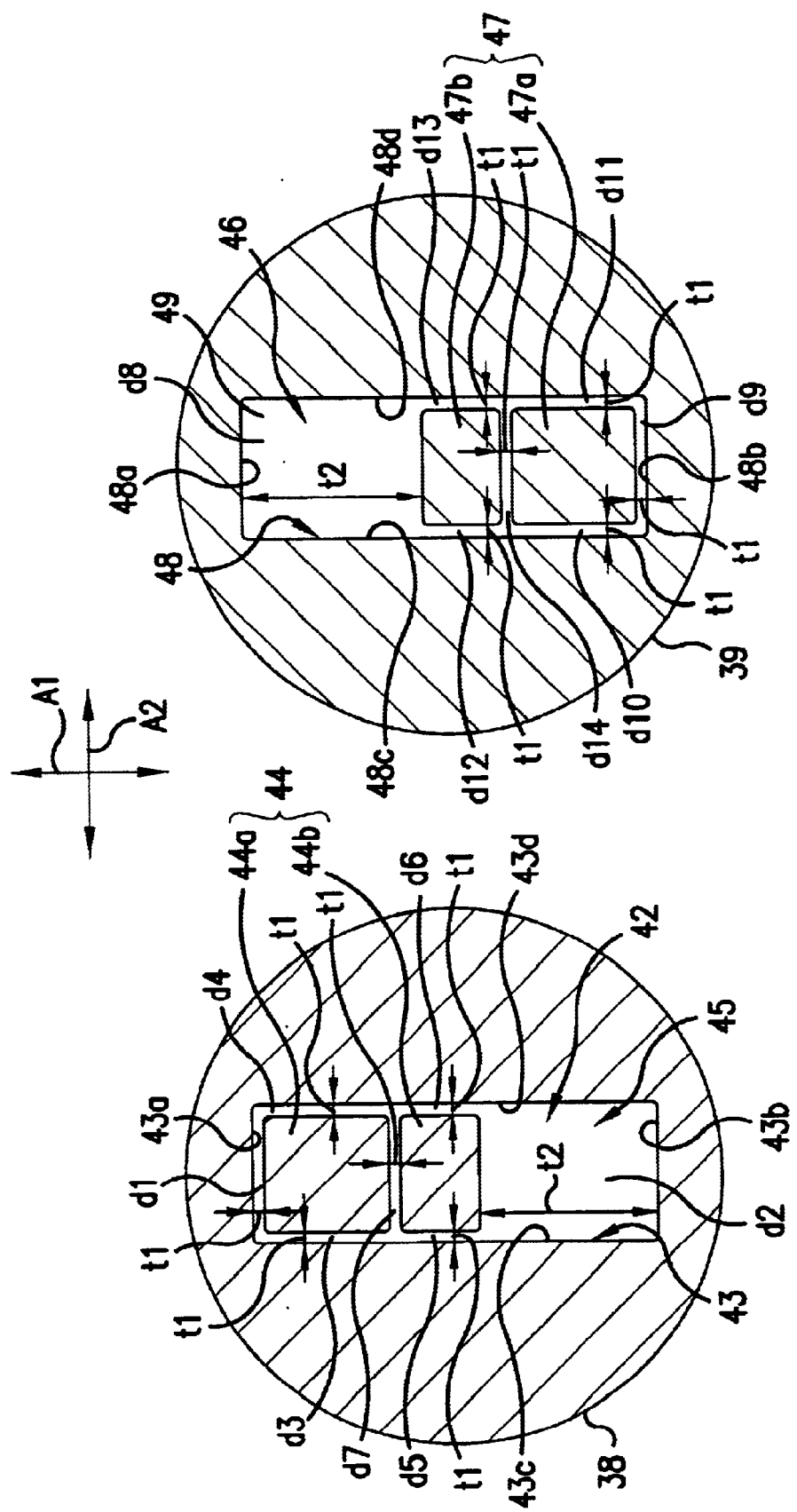
FIG. 9A is a plan for explaining the positional relation of a fixed die hole and a fixed core in a fixed die.
FIG. 9B is a plan for explaining the positional relation of a variable die hole and a variable core in a variable die.

As shown in FIGS. 4 to 9, through hole 42 having a substantially rectangular section having a longer side parallel to first direction A1 (in the first embodiment, as the set direction is a direction perpendicular to the direction of extrusion A0, the first direction A1 corresponds to the set direction) which is a direction when the set direction is projected on a plane perpendicular to the direction of extrusion A0 as shown in FIG. 9A is formed in fixed female die 37. Peripheral wall 43 of through hole 42 is formed in parallel with the direction of extrusion A0.

Figure 4:
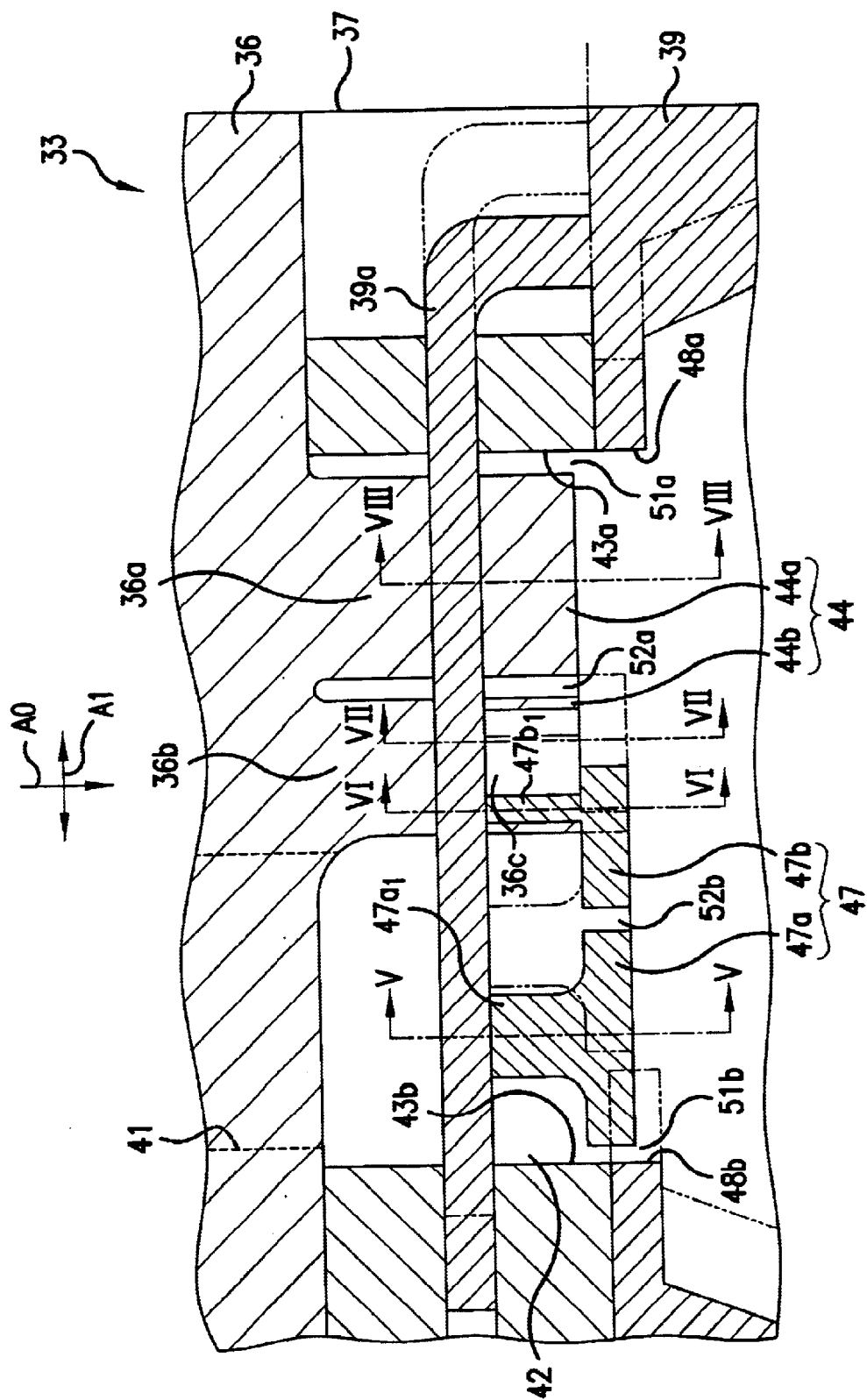
FIG. 4 is an enlarged sectional view showing the main part of the die for tube extrusion molding of the extruder shown in FIG. 3.
Figure 5:
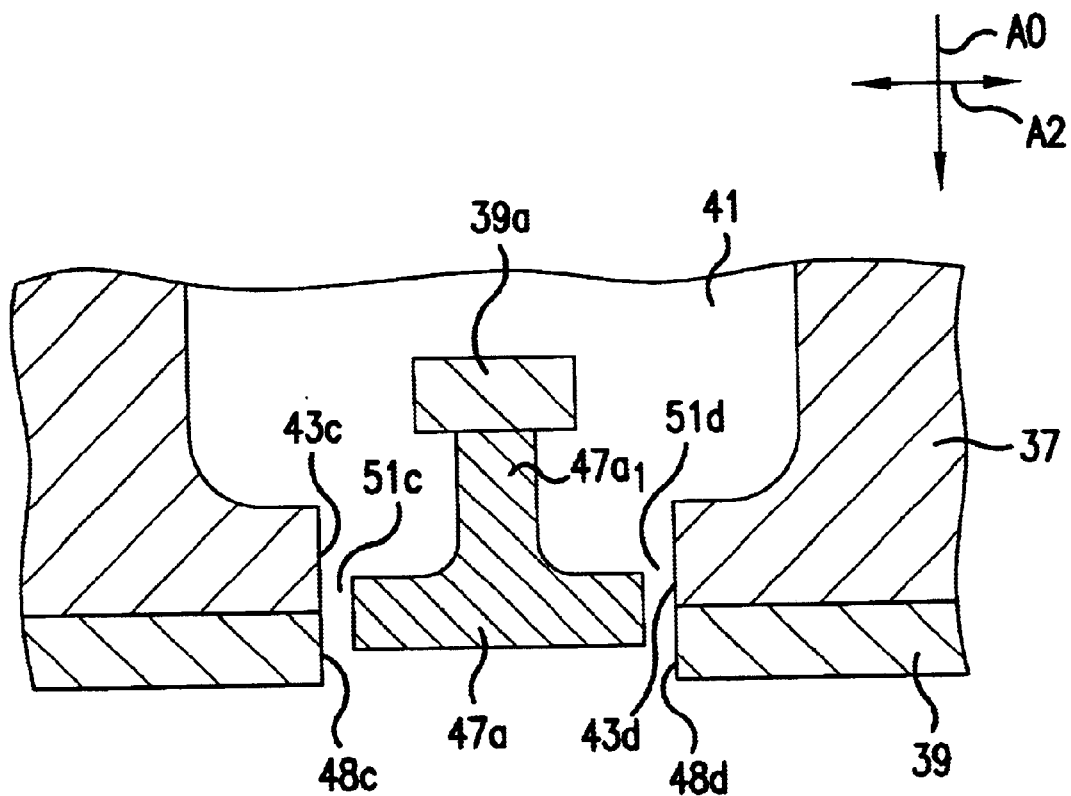
FIG. 5 is a sectional view viewed along a line V—V shown in FIG. 4.
Figure 6:
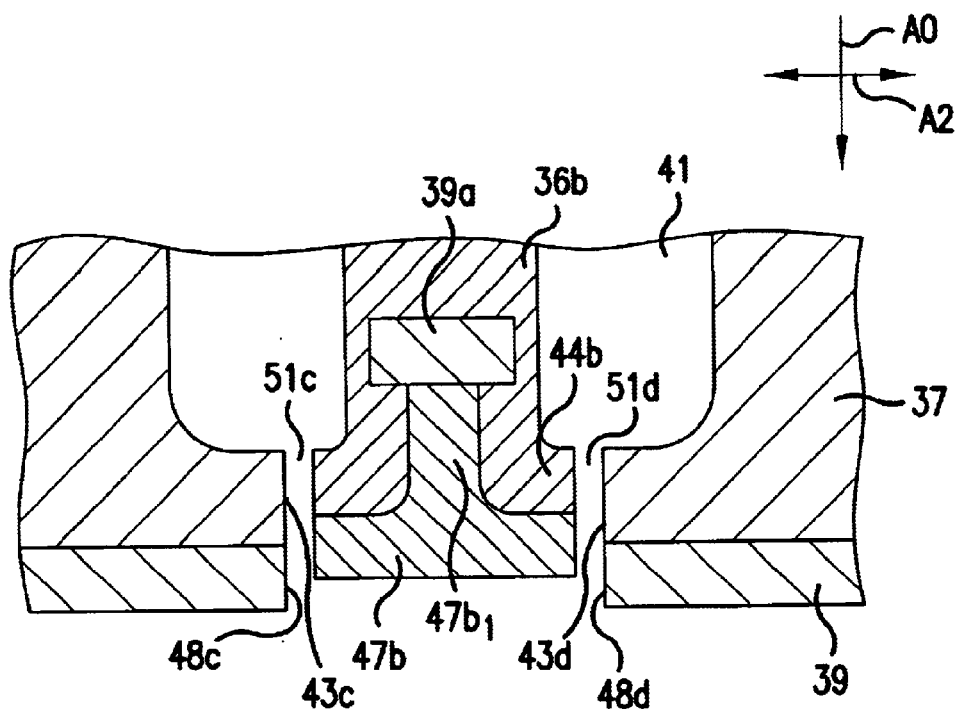
FIG. 6 is a sectional view viewed along a line VI—VI shown in FIG. 4.
Figure 7:
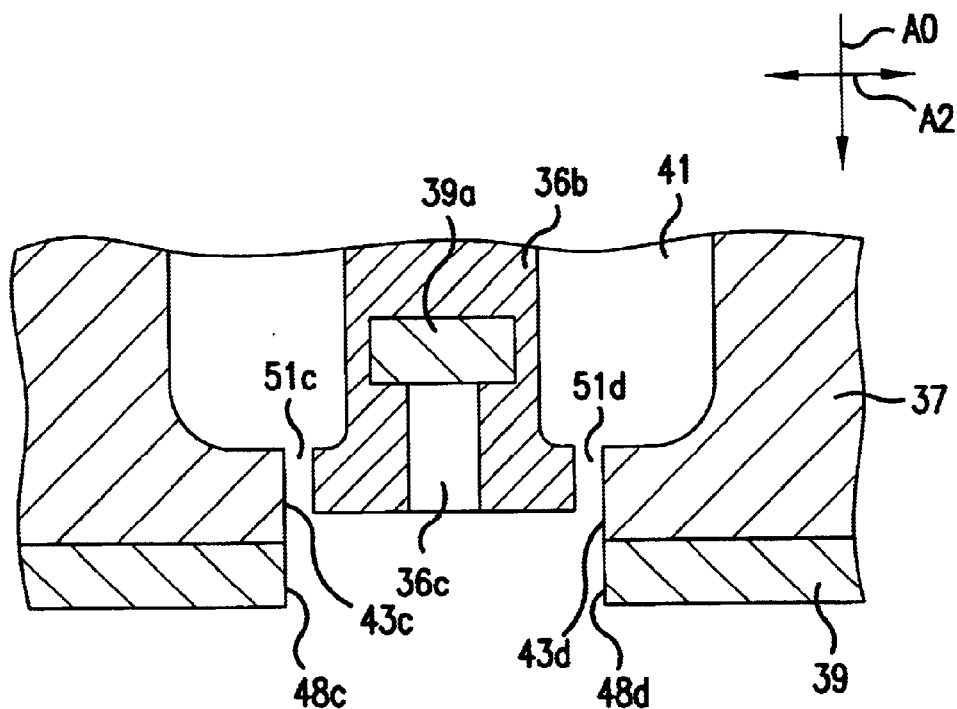
FIG. 7 is a sectional view viewed along a line VII—VII shown in FIG. 4.
Figure 8:
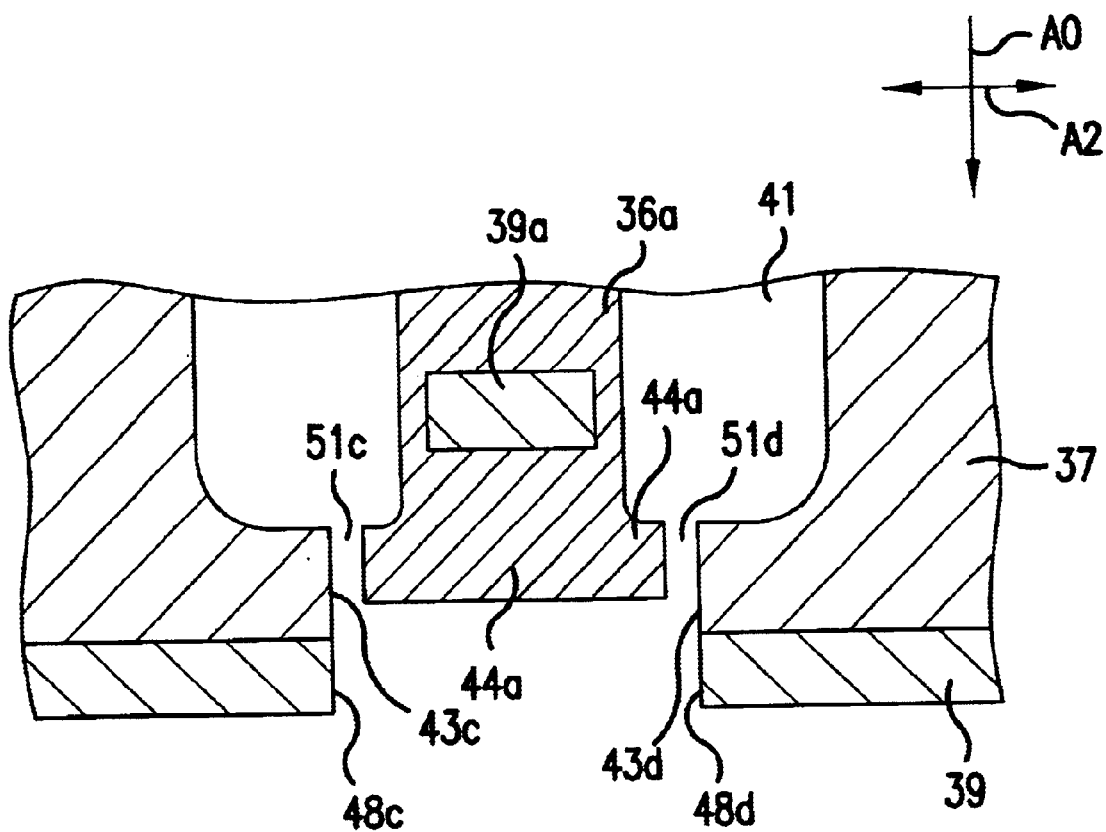
FIG. 8 is a sectional view viewed along a line VIII—VIII shown in FIG. 4.

As shown in FIG. 4, fixed core 44, which is provided via supporting parts 36*a* and 36*b* in fixed male die 36 and composed of first child core 44*a* and second child core 44*b* respectively arranged in parallel to the first direction A1, is arranged in through hole 42, thereby forming a void between the fixed core and peripheral wall 43. Peripheral wall 43 has a first peripheral wall part 43*a* and a second peripheral wall part 43*b* forming parallel shorter sides of a rectangle in the section and opposite in the first direction A1. Peripheral wall 43 also has a third peripheral wall part 43*c* and a fourth peripheral wall part 43*d* forming parallel longer sides and opposite in a second direction A2 perpendicular to the first direction A1 on the section (that is, on the above-mentioned perpendicular plane).

First child core 44*a*, the section of which is substantially square and a pair of sides in the first direction A1 of which are parallel to first and second peripheral wall parts 43*a* and 43*b*, forms voids d1, d3, and d4 respectively having predetermined width t1 between the first child core and first peripheral wall part 43*a* in the first direction A1, between the first child core and the third peripheral wall part 43*c* in the second direction A2, and between the first child core and fourth peripheral wall part 43*d*. Second child core 44*b*, the section of which is substantially rectangular, a pair of longer sides in the first direction A1 of which are parallel to first and second peripheral wall parts 43*a* and 43*b*, and the length of which is equal to a pair of sides of first child core 44*a*, forms voids d5 and d6 respectively. Voids d5 and d6 have a predetermined width t1 between second child core 44*b* and third peripheral wall part 43*c* in the second direction A2 and between second child core 44*b* and fourth peripheral wall part 43*d* in the second direction A2. Further, second child core 44*b* forms void d2 having a predetermined width t2 wider than predetermined width t1 between second child core 44*b* and second peripheral wall part 43*b* in the first direction A1. Further, void d7 between the cores having the predetermined width t1 in the first direction A1, continuously extended in the second direction A2 with the predetermined width t1, and continuing to the voids d5 and d6, is formed between first and second child cores 44*a* and 44*b*. Fixed die hole 45 is formed by a void including voids d1 to d7, and formed between first and second child cores 44*a* and 44*b* arranged in through hole 42 and peripheral wall 43.

Variable die 39 has through hole 46 having the same shape as through hole 42 of fixed female die 37, first child core 47*a*, and second child core 47*b* forming variable core 47 arranged in through hole 46, and extended from a part of the variable die 39 as shown in FIGS. 4 to 8. Variable die 39 is fitted to both supporting parts 36*a* and 36*b* of fixed male die 36, and into each supporting hole formed in fixed female die 37 so that first and second child cores 47*a* and 47*b* can be slid and are integrated with bar coupling member 39*a* linearly extended in the first direction A1 respectively via supporting parts 47*a*1 and 47*b*1. Cavity 36*c* formed in supporting part 36*b* and second child core 44*b* and open on the end face of second child core 44*b* is provided to enable supporting part 47*b*1 to move. As shown in FIG. 9B, the arrangement of first and second child cores 47*a* and 47*b* in through hole 46 is equivalent to that of fixed die 38 turned by 180 degrees in the first direction A1. The shape and the width of each void d8 to d13 formed between the first or second child core 47*a* or 47*b* and the first, second, third, or fourth peripheral wall part 48*a*, 48*b*, 48*c*, or 48*d* respectively forming peripheral wall 48, and void d14 formed between first and second child cores 47*a* and 47*b*, are also set as those of fixed die 38. Variable die hole 49 is formed by a void including voids d8 to d13, and formed between first or second child core 47*a* or 47*b* arranged in through hole 46 and peripheral wall 43.

When as shown in FIG. 10A, fixed die 38 and variable die 39 are positioned in a state in which the respective peripheral walls 43 and 48 of both through holes 42 and 46 are matched and fixed die 38 and variable die 39 are superposed, fixed core 44 and variable core 47 touch in the superposed parts as shown in FIG. 4. Further, outflow passage 50 is formed by the superposition of fixed die hole 45 and variable die hole 49 in the direction of extrusion A0 and forms the outflow passage for extruding material 31. Outflow passage 50 has a substantially rectangular form having a predetermined width t1 and is provided with an opening for a tube wall 51 which is an opening for forming tube wall 21 of tube 20, and an opening for an intermediate wall 52 which continues to the opening for a tube wall 51 at both end in the second direction A2. The opening for the intermediate wall 52 has the predetermined width t1 in the first direction A1, and is continuously linearly extended in the second direction A2. The opening for the intermediate wall 52 serves the purpose of forming connecting walls 22 and 23 as the intermediate wall in the inside space of tube 20.

The specific configurations of the opening for the tube wall 51 and the opening for the intermediate wall 52 are described next.

Opening for a tube wall 51 is composed of an opening for a first tube wall 51*a*, an opening for a second tube wall 51*b* opposite to the opening for the first tube wall 51*a* in the first direction A1, an opening for a third tube wall 51*c*, and an opening for a fourth tube wall 51*d* opposite to the opening for the third tube wall 51*c* in the second direction A2.

In a similar manner, the opening for the intermediate wall 52 is composed of an opening for the first intermediate wall 52*a* defined by the void between cores d7 and continuing to an opening for the third tube wall 51*c*, and an opening for the fourth tube wall 51*d* and an opening for a second intermediate wall 52*b* defined by the void between cores d14, formed in parallel to the opening for the first intermediate wall 52*a* and having a gap in the first direction A1, and continuing to the openings for third and fourth tube walls 51*c* and 51*d*. The length of the shorter sides, which is the length in the first direction A1 on the sections of both second child cores 44*b* and 47*b*, is respectively set so that a predetermined interval H1 in the first direction A1 is formed between the side on the side of the opening for the first intermediate wall 52*a* of second child core 47*b* and the side and the opening for the first intermediate wall 52*a*. As such, a predetermined interval H2 in the first direction A1 is formed between the side on the side of the opening for the second intermediate wall 52*b* of the second child core 44*b* and the side and the opening for the second intermediate wall 52*b*.

When the sectional form of the formed tube 20 varies in the longitudinal direction, these predetermined intervals H1 and H2, respectively set to an equal value in the first embodiment, are suitably set according to the width in the first direction A1 in a part in which connecting walls 22 and 23 are not required in the specific part of tube 20 where high rigidity not required.

Next, Referring to FIGS. 2, 9 and 10, a process for forming tube 20 by extruder 30 using the above-mentioned die for tube extrusion molding 33 will be described. In FIGS. 10, fixed die 38 and variable die 39 are shown by different hatching, a part shown by a void denotes opening 50 and a part in which both hatching is overlapped denotes a part in which fixed die 38 and variable die 39 are superposed. In FIGS. 9 and 10, cavity 36c is omitted.

First, in a state shown in FIG. 10A, the velocity ratio of the traveling speed of variable die 39 to an extrusion rate is set to predetermined velocity ratio and drive unit 40 continuously moves variable die 39 in one (upward in FIG. 10) of the set directions along the superposed surface, thereby extruding material 31 from the opening 50 by means of the ram. Thereby, tube 20 is formed. Tube wall 21 is formed by the opening for a tube wall 51 and having predetermined width t1, and connecting walls 22 and 23 respectively formed by the openings for first and second intermediate walls 52a and 52b and respectively having the predetermined width t1. (see FIG. 2). As the amount of the movement of variable die 39 increases, the width in the first direction A1 of a part in which both second child cores 44b and 47b are overlapped increases as shown in FIG. 10B for the shape of outflow passage 50. At the same time, the width between first peripheral wall 43a and second peripheral wall 48b respectively opposite in the first direction A1 decreases, a maximum interval between the openings for the first and second tube walls 51a and 51b respectively opposite in the first direction A1 decreases, and the sectional form in the direction of extrusion A0 of tube 20 varies.

Therefore, as shown in FIG. 2, the width of tube wall 21 in the first direction A1 (in a vertical direction) of tube 20 and an interval in the first direction A1 between both connecting walls 22 and 23 gradually becomes narrower. At the same time, the predetermined width t1 of the openings for first and second intermediate walls 52a and 52b is kept constant as variable die 39 is moved from FIG. 10A to FIG. 10B, thereby forming connecting walls 22 and 23 with a fixed thickness corresponding to the predetermined width t1 as they extend in the longitudinal direction (the direction of extrusion A0) of tube 20.

Next, as the variable die 39 is moved further, and material 31 is extruded at the above-mentioned predetermined velocity ratio, the opening for the first intermediate wall 52a is blocked by second child core 47b, and the opening for the second intermediate wall 52b is simultaneously blocked by second child core 44b (see the position of the variable die 39 shown by an alternate long and two short dashes line in FIG. 4) as shown in FIG. 10C, and the blocked state of the openings for both intermediate walls 52a and 52b is kept constant as variable die 39 moves further. As soon as second child core 47b begins to block the opening for the first intermediate wall 52a, and second child core 44b begins to block the opening for the second intermediate wall 52b, in a state shown in FIG. 10C, the thickness of connecting walls 22 and 23 begins to decrease from predetermined width t1 to a width of zero.

The width in the first direction A1 of tube 20 when the openings for both intermediate walls 52a and 52b begin to be blocked (that is, the width between the first tube wall part 21a and the second tube wall part 21b which are respectively a pair of tube wall parts opposite in the first direction A1 of the tube wall 21) is suitably set according to the point along the length of tube 20 at which the increased rigidity provided by connecting walls 22 and 23, respectively connecting third tube wall part 21c and fourth tube wall part 21d which are respectively a pair of tube wall parts opposite in the second direction A2 of tube wall 21, is not required.

As a result, as shown in FIG. 2, second tube wall part 21b becomes a tapered wall inclined so that second tube wall part 21b gradually approaches first tube wall part 21a parallel to the direction of extrusion A0. Thus, tube 20 becomes a tapered tube the width in the second direction A2 of which is equal in the longitudinal direction and the width in the first direction A1 of which gradually becomes narrower from an extrusion start end (the front end) 20a to an extrusion termination end (the rear end) 20b in the longitudinal direction. In addition, since the front of tube 20 is wider in the first direction A1 and has two connecting walls 22 and 23, and the rear of tube 20 has no connecting walls 22 and 23, tube 20 is different in the number of formed connecting walls in the longitudinal direction.

Next, the action and the effect of the above first embodiment will be described.

Since connecting walls 22 and 23 are formed by moving variable die 39 in the set direction for fixed die 38, and by extruding material 31 from opening 50, extruder 30 can easily form tube 20 having high rigidity.

As described above, tube 20 is composed of a part having the two connecting walls 22 and 23 in the longitudinal direction, and another part having no connecting walls 22 and 23, and is easily manufactured by extrusion molding by controlling the amount of the movement of the variable die 39 according to the magnitude of the rigidity required along the length of tube 20. This is accomplished by using a die in which outflow passage 50 having the opening for the first intermediate wall 52a opened or blocked by the second child core 47b according to the amount of the movement of the variable die 39, and the opening for the second intermediate wall 52b opened or blocked by the second child core 44b according to the amount of the movement of the variable die 39. This permits the easy and cost effective forming of tube 20, one part having a number of the connecting walls 22 and 23 according to the magnitude of the required rigidity, and another part having no connecting walls 22 and 23. This configuration causes the rigidity to be different in the longitudinal direction. Further, since connecting walls 22 and 23 are formed in only a part of tube 20 requiring high rigidity, the weight of tube 20 can be held to a minimum, compared with a tube in which connecting walls are formed along the entire length of the tube.

As head pipe 1 of motorcycle V is formed by tube 20, the front including the connection 5a to the head pipe 1 has high rigidity. This is because the front has two connecting walls 22 and 23. On the other hand, the rear of the main pipe 5 has relatively low rigidity, because the rear has no connecting walls 22 and 23. Since connection 5a has high rigidity, and spring is caused because the rear has relatively low rigidity, the ride quality of motorcycle V is enhanced. In addition, as tube 20 forming main pipe 5 is manufactured by extrusion molding, manufacturing productivity is enhanced, the cost of manufacturing motorcycle V can be reduced.

As previously described, the openings for both intermediate walls 52a and 52b are made in an open state in which the predetermined width t1 is maintained, and in a state in which a blocked state is maintained respectively according to the amount of the movement of variable die 39 by both second child cores 44b and 47b. This results in the forming of connecting walls 22 and 23 having a fixed width corresponding to the predetermined width t1 in the longitudinal direction in the inside space of tube 20. This is the case even when the width of tube 20 varies in the first direction A1, and even in the case when the width of tube 20 is increased in the first direction A1. As such, an increase in the weight of tube 20, can be minimized since connecting walls 22 and 23 are not required along the entire tube length.

Next, referring to FIGS. 11 to 13, a second embodiment of the invention will be described. The second embodiment differs from the first embodiment only in respect to the width in a first direction A1 of second child core 47b of variable die 39. The other parts basically have the same configuration. Therefore, the following description mainly focuses on how the two embodiments differ.

Figures 11A, 11B:
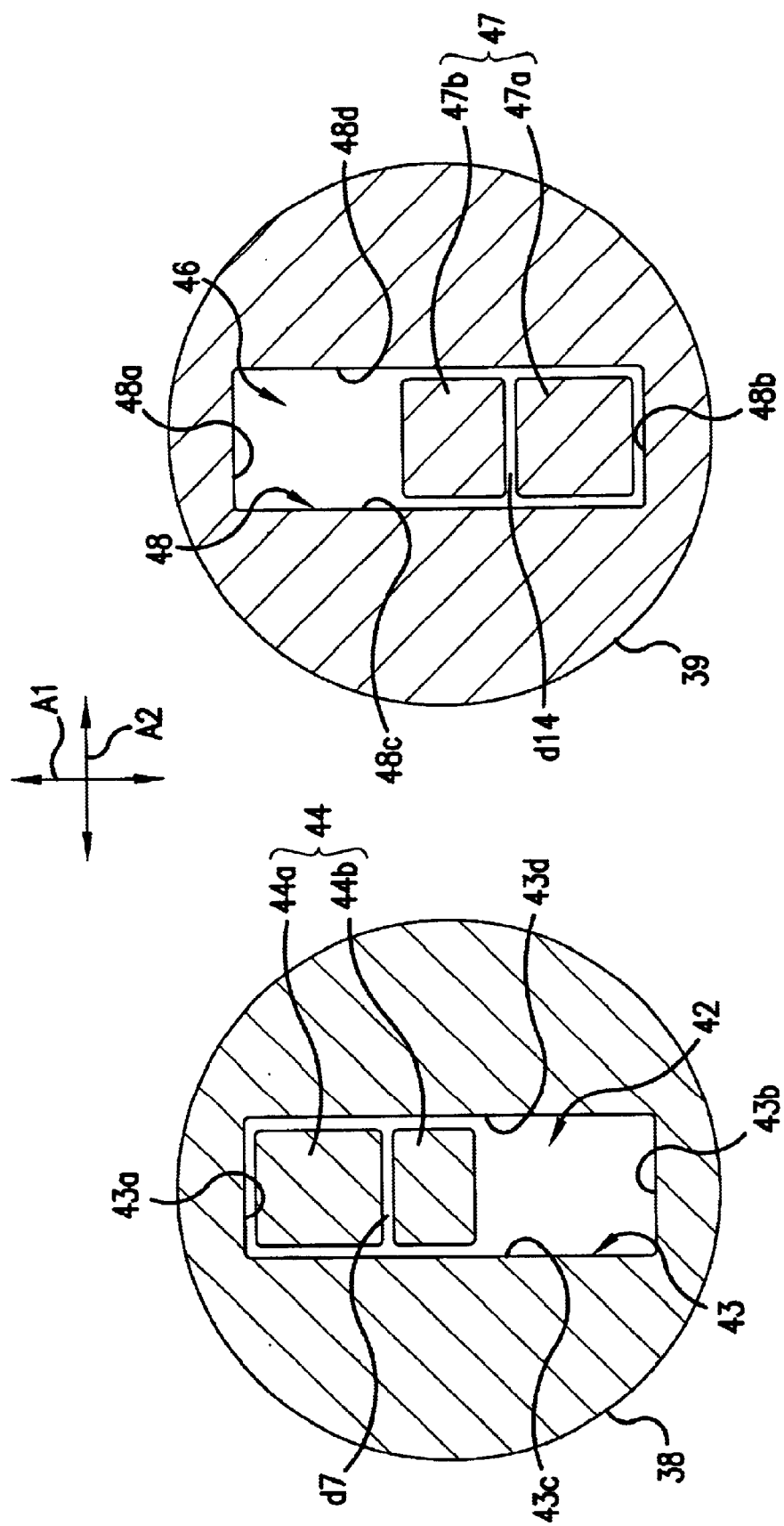
FIGS. 11A and 11B show a second embodiment of the invention and correspond to FIGS. 9A and 9B in the first embodiment.

As shown in FIGS. 11, in the second embodiment, the width in the first direction A1 of second child core 47b is set so that it is larger than the width in the first direction A1 of second child core 44b of fixed die 38. Therefore, as shown in FIG. 12A, in a state in which fixed die 38 and variable 39 are positioned so that the respective peripheral walls 43 and 48 of both through holes 42 and 46 are matched, a predetermined interval H1 in the first direction A1 between second child core 47b and an opening for a first intermediate wall 52a is shorter, compared with that in the first embodiment.

When drive unit 40 continuously moves variable die 39 in one of the set directions (upward in FIGS. 12A, 12B, and 12C) along the superposed surface, material 31 is extruded from outflow passage 50 in this state. This action produces tube 60 having a tube wall 61 formed by an opening for a tube wall 51, the tube having the thickness of predetermined width t1, and two connecting walls 62 and 63, respectively, are formed by openings for both intermediate walls 52a and 52b and have the thickness of predetermined width t1.(see FIG. 13).

Figure 13:
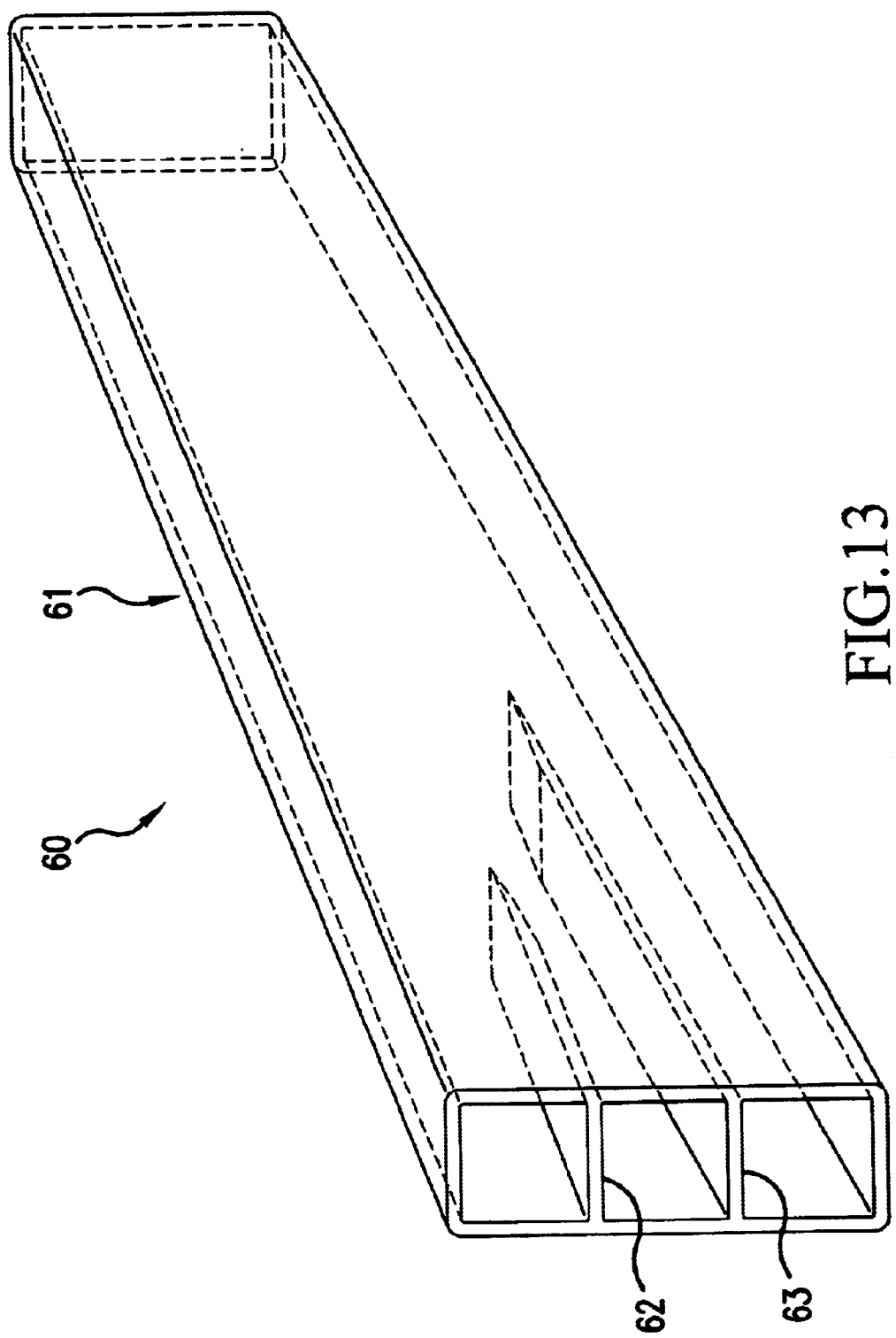
FIG. 13 is a perspective view showing a tube formed according to the second embodiment.
Figure 14:
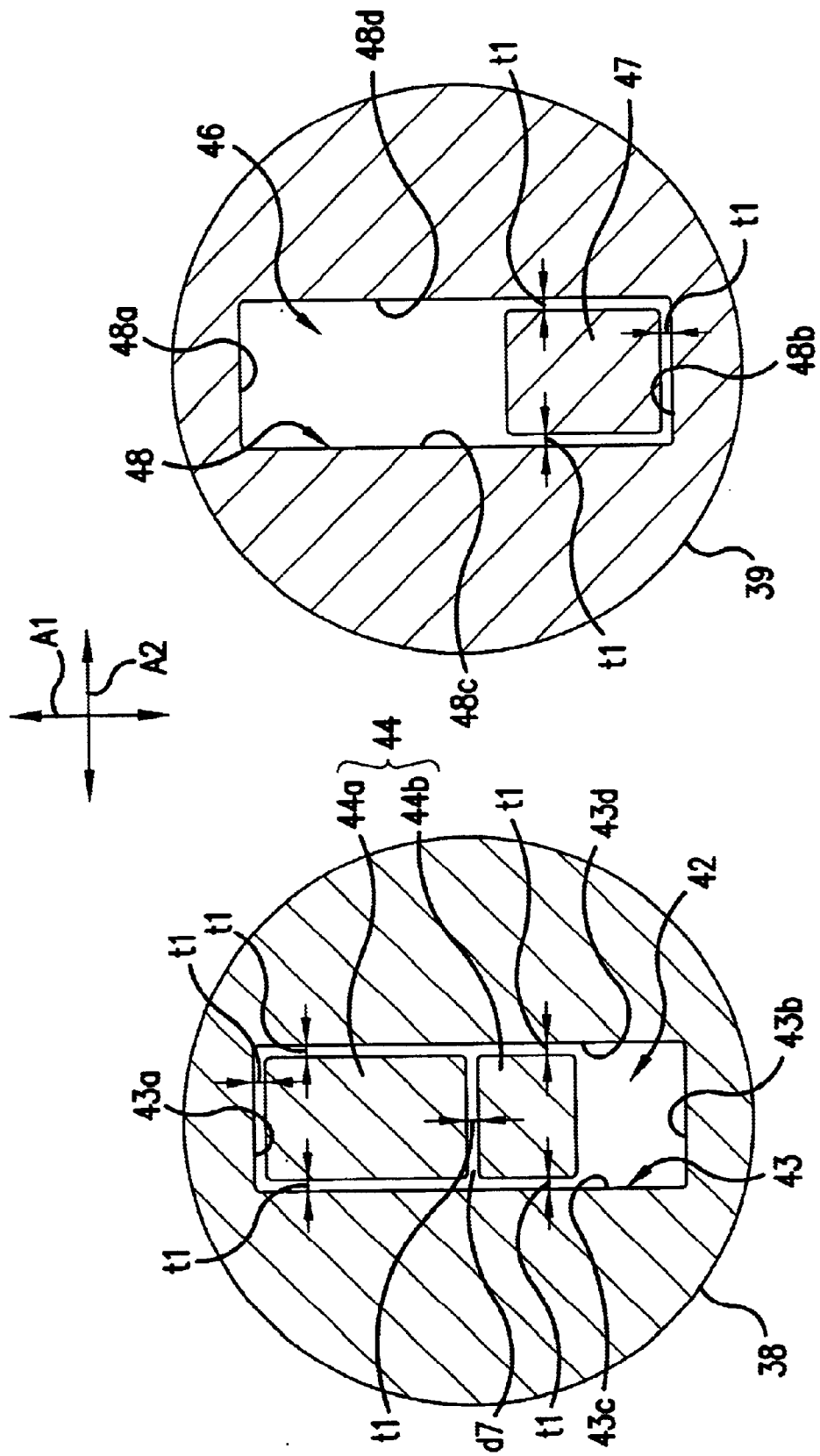
FIGS. 14A and 14B show a third embodiment of the invention and correspond to FIGS. 9A and 9B in the first embodiment.

When variable die 39 moves further to the state shown in FIG. 12B, the width of tube wall 61 in the first direction A1 of tube 60 and an interval in the first direction A1 between both connecting walls 62 and 63 gradually becomes narrower as shown in FIG. 13. Simultaneously, the width in the first direction A1 of a part in which both second child cores 44b and 47b are superposed increases, the opening for first intermediate wall 52a is blocked by second child core 47b, the block state of the opening for the first intermediate wall 52a is maintained in the amount of the further movement of the variable die 39, and the opening for the second intermediate wall 52b is maintained in an open state by a predetermined width t1. Therefore, when variable die 39 is moved from the state of FIG. 12A toward the state before FIG. 12B, the open state by the predetermined width t1 of the openings for both intermediate walls 52a and 52b is maintained, and connecting walls 62 and 63 having fixed thickness corresponding to the predetermined width t1 are formed. Then, from the time immediately after second child core 47b begins to block the opening for the second intermediate wall 52b to time that the state shown in FIG. 12B is achieved, connecting wall 62 is formed with a thickness that varies from the predetermined width t1 to a width of zero.

Next, as variable die 39 is further moved, material 31 is extruded, but the opening for the second intermediate wall 52b is blocked by second child core 44b as shown in FIG. 12C. The blocked state of the opening for the second intermediate wall 52b is maintained even as variable die 39 moves further.

As a result, as shown in FIG. 13, tube wall 61 of tube 60 becomes tapered as in the first embodiment. FIG. 13 also shows that tube 60 has a front width that is large in the first direction A1 and has two connecting walls 62 and 63. The part just to the rear of the front has one connecting wall 63, and the part to the rear of the tube has no connecting walls 62 and 63. Thus, the number of connecting walls formed varies along the length of the tube. As in the first embodiment, the point at which each blocked state of the openings for both intermediate walls 52a and 52b is started, is determined by the location along the length of tube 60 at which specific levels of rigidity are required.

The second embodiment has similar actions and effects as compared to those in the first embodiment. However, since tube 60 has two connecting walls 62 and 63 extended in different lengths in the longitudinal direction and has a part having the two connecting walls 62 and 63, a part having one connecting wall 63, and a part having no connecting wall, the magnitude of the rigidity of tube 60 gradually decreases over its length. Tube 20 of the first embodiment does not have this gradual decrease in rigidity.

Figure 15:
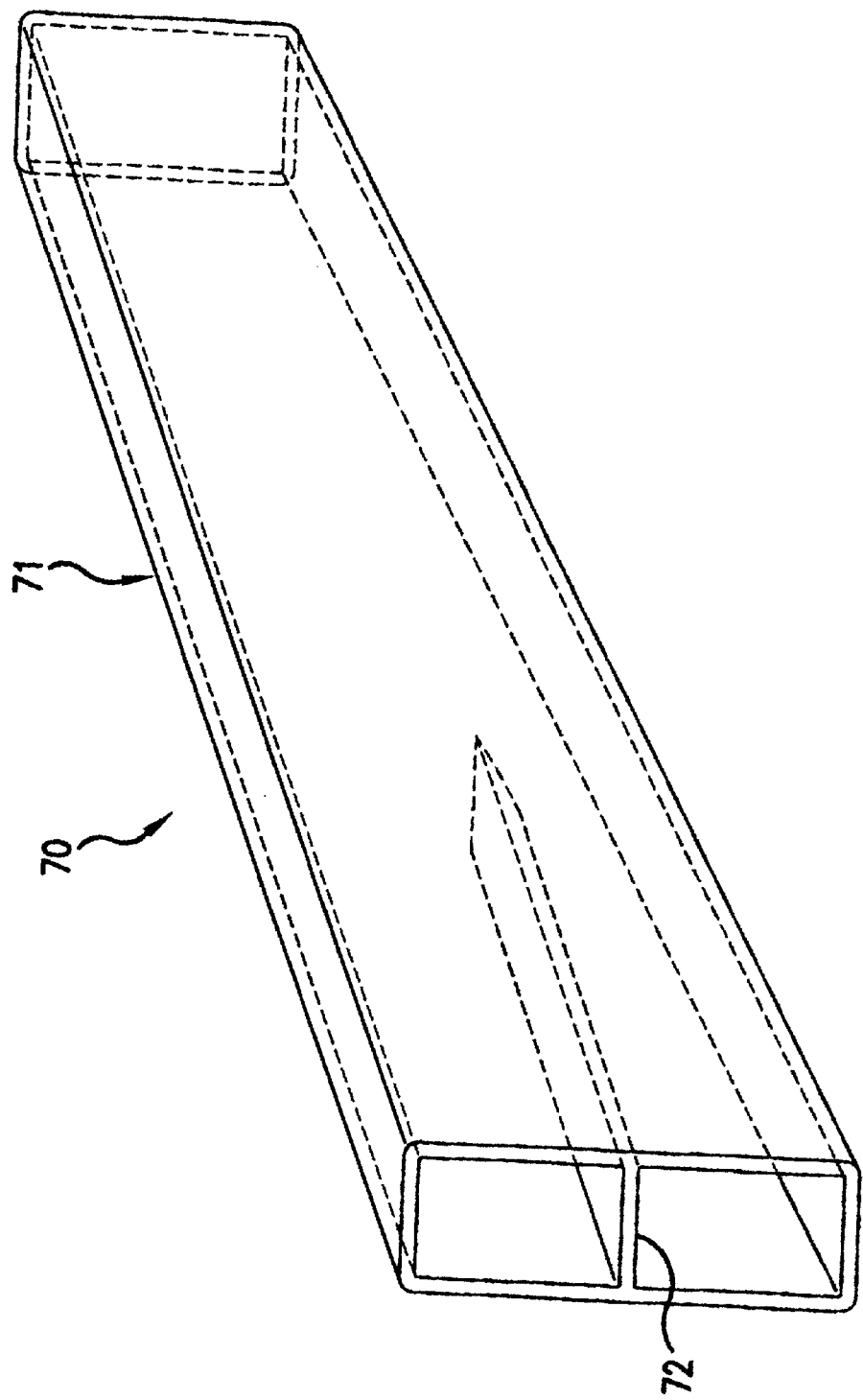
FIG. 15 is a perspective view showing a tube formed according to the third embodiment.

Next, referring to FIGS. 14A, 14B, and 15, a third embodiment of the invention will be described. The third embodiment is different from the first embodiment only in respect to fixed core 44 and variable core 47. The other parts basically have the same configuration. Therefore, the description that follows will focus on how the embodiments differ.

As shown in FIGS. 14A and 14B, in the third embodiment, the width in a first direction A1 of first child core 44a of fixed core 44 is increased, compared with that in the first embodiment so that a void between cores d7 is positioned in the substantially center in the first direction A1 of through hole 42. In the meantime, variable core 47 is formed by a single core.

In a state in which fixed die 38 and variable die 39 are positioned so that the respective peripheral walls 43 and 48 of both through holes 42 and 46 are matched, a predetermined interval in the first direction A1 is formed between variable core 47 and an opening for an intermediate wall defined by the void between cores d7 and the opening for the intermediate wall is open by predetermined width t1. When variable die 39 is continuously moved in one of set directions along the superposed surface, material 31 is extruded from the opening, forming tube 70. Tube 70 has tube wall 71 having the thickness of the predetermined width t1 formed by an opening for the tube wall, and connecting wall 72 having the thickness of the predetermined width t1 formed by the opening for the intermediate wall is formed as shown in FIG. 15.

When variable die 39 moves, the opening for the intermediate wall is blocked by variable core 47 and the blocked state of the opening for the intermediate wall is maintained. As a result, as shown in FIG. 15, wall 71 of tube 70 becomes tapered as in the first embodiment. In addition, the front of tube 70 has one connecting wall 72, and the rear of tube 70 has no connecting wall 72. In other words, as in the first and second embodiments, the number of connecting walls formed differs along the length of the tube.

The actions and effects of the third embodiment are similar to those in the first embodiment, except that the rigidity of the tube 70 is slightly lower compared with the rigidity in the first embodiment.

Another configuration will be described below.

A tube having three or more connecting walls can be also formed by arranging three or more child cores in at least one die hole out of fixed die hole 45 and variable die hole 49. In the case where a die for tube extrusion molding has a plurality of voids between cores, one of which must never be blocked by a core.

In each of the above-mentioned embodiments, fixed die 38 is fixed to container 32, however, both dies are moved in reverse directions by a drive unit by forming the fixed die so that it can be freely moved from container 32, and also forming both dies as a variable die. In this configuration, each wall opposite in the first direction A1 of a tube may become a tapered wall inclined in the longitudinal direction.

In each of the above-mentioned embodiments, the width in the first direction A1 of the tube continuously decreases in the longitudinally direction from the extrusion start end. However, the above-mentioned width may also increase or decrease in the longitudinal direction. Other adjustments can also be made. For example, a tube having parts different in the inclination of a tapered part can be formed by changing the above-mentioned velocity ratio while material 31 is extruded. In addition, the length in the longitudinal direction of the connecting wall can be also adjusted. Further, a part having a fixed section can be also formed by setting the velocity ratio to zero.

The above-mentioned set direction is the direction perpendicular to the direction of extrusion A0, however, it may be also a direction on a plane not perpendicular to the direction of extrusion A0. Each width in the first direction A1 of fixed die hole 45 and variable die hole 49 may be also different.

In each of the above-mentioned embodiments, the intermediate wall is the connecting wall connecting a pair of tube walls opposite in the second direction A2. However, other intermediate wall configurations are possible. For instance, an intermediate wall may also be formed, wherein the intermediate wall is separated in the second direction A2 in an intermediate part of a pair of tube walls, and without connecting the pair of tube walls, and is formed by connecting the plurality of child cores of fixed core 44 and the plurality of child cores of variable core 47 in an intermediate position in the second direction A2 and a void extended in the longitudinal direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for extruding a tube having different sections where the tube is formed by using a die for tube extrusion molding having a first die and a second die which are superposed in a direction of extrusion, the first die and the second die being relatively movable in a set direction along the superposed surface, in order to permit the extrusion of a material via an outflow passage formed by the superposition in the direction of extrusion of a first die hole formed in the first die and a second die hole formed in the second die, and thereby causing a sectional form of the tube to be varied in the direction of extrusion by relatively moving the first die and the second die in the set direction, comprising the steps of:

providing the outflow passage with an opening for a tube wall and at least one opening for an intermediate wall which continues to the opening for the tube wall inside the opening for the tube wall;

extending the opening for the tube wall for a predetermined width in a first direction which is a direction when the set direction is projected on a plane perpendicular to the direction of extrusion, and extending the opening for the tube wall in a second direction crossing the first direction on the perpendicular plane;

relatively moving the first die and the second die in the set direction;

extruding the material from opening for the tube wall and the opening for the intermediate wall;

forming the tube wall having a width in the first direction which varies in a longitudinal direction by varying the opening for the tube wall; and simultaneously forming the intermediate wall being formed in an inside space of the tube, and having a fixed thickness and a predetermined width in the first direction, extending in the longitudinal direction, and continuing to the tube wall in the inside space of the tube, wherein the intermediate wall is at least one connecting wall which connects two tube wall parts opposite in the second direction of the tube wall, and which partitions the inside space into a plurality of independent partial spaces on the section of the tube, and wherein a width of the connecting walls increases or decreases in the longitudinal direction from the extrusion start end.

2. The process for extruding a tube having different sections according to claim 1, wherein:

the number of the connecting walls in the longitudinal direction of the tube is changed by opening or blocking at least one of the openings for the intermediate walls according to an amount of the relative movement in the set direction of the first die and the second die.

3. The process for extruding a tube having different sections according to claim 2, wherein the number of connecting walls is two or more and these connecting walls extend in the longitudinal direction by different lengths.

4. A process for extruding a tube having different sections, comprising the steps of:

superimposing a first die and a second die in a direction of extrusion;

providing an outflow passage having an opening for a tube wall and at least one opening for an intermediate wall which continues to the opening for the tube wall inside the opening for the tube wall;

extending the opening for the tube wall for a predetermined width in a first direction which is a direction when the set direction is projected on a plane perpendicular to the direction of extrusion, and extending the opening for the tube wall in a second direction crossing the first direction on the perpendicular plane;

relatively moving the first die and the second die in the set direction;

extruding the material from opening for the tube wall and the opening for the intermediate wall;

forming the tube wall having a width in the first direction which varies in a longitudinal direction by varying the opening for the tube wall;

simultaneously forming the intermediate wall in an inside space of the tube, the intermediate wall having a fixed thickness and a predetermined width in the first direction, extending in the longitudinal direction, and continuing to the tube wall in the inside space of the tube; and causing the intermediate wall to partition the inside space into a plurality of independent partial spaces on the section of the tube, the intermediate wall being at least one connecting wall which connects two tube wall parts opposite in the second direction of the tube wall, wherein a width of the at least one connecting wall increases or decreases in the longitudinal direction from the extrusion start end.

5. The process for extruding a tube having different sections according to claim 4, further comprising the step of:

changing the number of the connecting walls in the longitudinal direction of the tube by opening or blocking at least one of the openings for the intermediate walls according to an amount of the relative movement in the set direction of the first die and the second die.

6. The process for extruding a tube having different sections according to claim 4, wherein the number of connecting walls is two or more and these connecting walls may extend in the longitudinal direction by different lengths.

7. A die for tube extrusion molding comprising:

a first die and a second die which are superposed in a direction of extrusion and which are relatively movable in a set direction along the superposed surface, said first die having a first die hole formed by a void between a first peripheral wall of a first hole formed in the first die and a first core arranged in the first hole and integrated with the first die, said second die having a second die hole formed by a void between a second peripheral wall of a second hole formed in the second die and a second core arranged in the second hole and integrated with the second die;

an outflow passage formed by the superposition in the direction of extrusion of the first die hole and the second die hole for extruding a material to form a tube;

said first core being composed of a plurality of child cores arranged in parallel, having predetermined width in a first direction which is a direction when the set direction is projected on a plane perpendicular to the direction of extrusion, and forming a void between the plurality of child cores extended in a second direction crossing the first direction on the perpendicular plane;

said outflow passage having an opening for a tube wall formed by a void between the first peripheral wall or the second peripheral wall and the first core or the second core, and also having an opening for a first intermediate wall defined by the void between the first cores and continuing to the opening for the tube wall;

the first die and the second die being superposed so that the maximum interval in the first direction of the opening for the tube wall can be varied according to the amount of the relative movement in the set direction of the first die and the second die;

the second core keeping at least one of the openings for the first intermediate wall in an open state by the predetermined width and in a blocked state;

wherein the intermediate wall is at least one connecting wall which connects two tube wall parts opposite in the second direction of the tube wall, and which partitions the inside space into a plurality of independent partial spaces on the section of the tube, and wherein a width of the at least one connecting wall increases or decreases in the longitudinal direction from the extrusion start end.

8. The die for tube extrusion molding according to claim 7, wherein:

the void between the first cores is continuously extended in a second direction;

the second core being composed of a plurality of child cores arranged in parallel respectively having a predetermined width in the first direction and forming a void between at least one of the second cores continuously extended in the second direction;

the outflow passage having an opening for a second intermediate wall defined by a void between the second cores and continuing to the opening for the tube wall; and the first die and the second die being superposed so that the first core keeps at least one of the openings for the second intermediate wall in an open state by the predetermined width and in a blocked state according to an amount of the relative movement in the set direction of the first die and the second die.

9. The die for tube extrusion molding according to claim 7 wherein: the number of the connecting walls in the longitudinal direction of the tube is changed by opening or blocking at least one of the openings for the intermediate walls according to an amount of the relative movement in the set direction of the first die and the second die.

10. The die for tube extrusion molding according to claim 9 wherein:

the number of connecting walls is two or more and said connecting walls extend in the longitudinal direction by different lengths.

* * * * *